(12) United States Patent
Mercer

(10) Patent No.: US 6,215,291 B1
(45) Date of Patent: Apr. 10, 2001

(54) REFERENCE VOLTAGE CIRCUIT

(75) Inventor: Mark J. Mercer, Tucson, AZ (US)

(73) Assignee: National Semiconductor Incorporated, Santa Clara, CA (US)

( * ) Notice: Subject to any disclaimer, the term of this patent is extended or adjusted under 35 U.S.C. 154(b) by 0 days.

(21) Appl. No.: 09/550,850

(22) Filed: Apr. 17, 2000

Related U.S. Application Data

(62) Division of application No. 09/235,134, filed on Jan. 21, 1999, now Pat. No. 6,100,667.

(51) Int. Cl.$^7$ .................................................... G05F 3/26
(52) U.S. Cl. ............................................ 323/313; 323/314
(58) Field of Search ................................. 323/312, 313, 323/314, 315, 316

(56) References Cited

U.S. PATENT DOCUMENTS

| | | | | |
|---|---|---|---|---|
| 4,524,318 | * | 6/1985 | Burnham et al. ...................... | 323/313 |
| 4,897,595 | * | 1/1990 | Holle .................................... | 323/314 |
| 5,132,556 | * | 7/1992 | Cheng .................................. | 327/539 |
| 5,391,980 | * | 2/1995 | Thiel et al. ........................... | 323/314 |
| 5,479,092 | * | 12/1995 | Pigott et al. ......................... | 323/313 |
| 5,686,823 | * | 11/1997 | Rapp .................................... | 323/313 |
| 5,926,062 | * | 7/1999 | Kuroda ................................. | 327/538 |
| 6,016,051 | * | 1/2000 | Can ...................................... | 323/315 |

* cited by examiner

*Primary Examiner*—Adolf Deneke Berhane
(74) *Attorney, Agent, or Firm*—Skjerven Morrill MacPherson LLP; Carmen C. Cook

(57) ABSTRACT

A control circuit is provided to minimize the charging cycle time of a battery charging system by maximizing the length of time that high constant charging current is applied to a discharged battery. The control circuit includes a constant current (CC) error amplifier, a constant voltage (CV) error amplifier, an output amplifier, and two pole-splitting compensation networks. The control circuit works in conjunction with a power source to charge a secondary battery. The pole-splitting compensation networks allow the CC, CV, and output amplifiers to be configured for high gain, without sacrificing output stability. The control circuit provides a sharp transition between the CC mode and CV mode of operation. In the CC mode, fast bulk battery charging is provided. In the CV mode, the control circuit initially provides a "top-off" charge to the battery and subsequently safely maintains the battery at its fully charged state. By using bi-directional transconductance error amplifiers as the CC and CV error amplifiers, the control circuit can be optimized for pole-splitting compensation. The control circuit can be operated with a constant internal reference voltage or a variable internal reference voltage. When a variable internal reference voltage is applied, the charging cycle time of the control circuit is further minimized through a charge current compensation technique.

9 Claims, 9 Drawing Sheets

$V_{DC} = I_{BATT} * R103$ $V_{BATT} = V_{charge} + V_{esr}$ $V_{charge}$ (Resistance Free Voltage)

$V_{OUT} = V_{BATT} + V_{DC}$ when $t > T0$ $V_{ref} = V_{ref0} + V_{os}$ where $V_{ref0}$ is constant and $V_{os}$ is a function of $V_{OUT}$

REFERENCE VOLTAGE CIRCUIT

This application is a divisional of application Ser. No. 09/235,134, filed Jan. 21, 1999, entitled "Current-To-Voltage Transition Control Of A Battery Charger" of Mark J. Mercer and Stuart B. Shacter, now U.S. Pat. No. 6,100,667, issued Aug. 8, 2000, owned by the assignee of this application and is incorporated herein by reference in its entirety. This application also relates to application Ser. No. 09/551,239, filed Apr. 17, 2000, entitled "Current-To-Voltage Transition Control Of A Battery Charger" of Mark J. Mercer and Stuart B. Shacter, now U.S. Pat. No. 6,166,521, issued Dec. 26, 2000, owned by the assignee of this application and is incorporated herein by reference in its entirety.

BACKGROUND OF THE INVENTION

1. Field of the Invention

The present invention relates to battery charging systems, and in particular, to a control system for reducing total charging time by maximizing the time high current flows across a secondary battery being charged.

2. Discussion of the Related Art

In a battery charging system for a lithium-ion or lead acid battery, a constant current (CC) mode of operation applies a high current across the discharged battery to provide rapid charging. When the battery reaches a final termination voltage, the battery charging system switches to a constant voltage (CV) mode of operation to maintain the battery at its termination voltage level. CC charging cannot be applied to the battery once it reaches its termination voltage since the energy storage capacity of the battery would be exceeded, leading to battery and charging system damage. However, in order to minimize overall charging cycle time, the CC charging time must be maximized. Therefore, the sharpness of the transition between the two modes of operation is a crucial factor in the productivity of the battery charging system. In a conventional battery charging system, the CC and CV control loops are based on a control circuit including three amplifier stages. FIG. 1 depicts a conventional battery charging circuit 100. Referring to FIG. 1, a control circuit 190 includes a CC amplifier 105 and a CV amplifier 106 that control the output of an output amplifier 108. During CC mode operation, a charging current Ibatt flowing through a battery 102 being recharged is measured by a current detector 103. CC amplifier 105 monitors the output of current detector 103 and signals output amplifier 108 to control an output voltage Vout of a power source 101 to maintain current Ibatt at a high rapid-charging current Imax. Meanwhile, CV amplifier 106 monitors the voltage across battery 102 as measured by a voltage detector 104. When the voltage across battery 102 reaches a final termination voltage Vfinal, CV amplifier 106 assumes control of output amplifier 108 and maintains voltage Vfinal across battery 102. One example of current detector 103 is shown in FIG. 3a. A current sense resistor 301 placed in series with battery 102 generates a voltage Vdc proportional to current Ibatt. In FIG. 3b, one example of voltage detector 104 includes a differential amplifier 302 that generates a voltage Vbatt which varies with the difference between voltages Vout and Vcs. Returning to FIG. 1, a voltage Vs at the non-inverting terminal and a reference voltage Vref at the inverting terminal of output amplifier 108 generate a control voltage Vc that regulates voltage Vout from power source 101. Voltage Vs is provided by summing the output currents of CC amplifier 105 and CV amplifier 106. An example of CC amplifier 105 shown in FIG. 2a includes an error amplifier 201 that compares voltage Vdc to a reference voltage Vrapid. Voltage Vrapid is defined by the following equation:

$$Vrapid = Imax * R301$$

where R301 is the resistance of current sense resistor 301 of FIG. 3a. At the same time, an example of CV amplifier 106 includes an error amplifier 202 to compare voltage Vbatt to final termination voltage Vfinal. Output contentions at error amplifiers 201 and 202 are prevented by diodes 203 and 204. A resistor 112 sums the current output of amplifiers 105 and 106 to provide the voltage Vs. While battery voltage Vbatt is less than voltage Vfinal, CV amplifier 106 provides a high impedance output. Therefore, error amplifier 201 is able to adjust voltage Vs as necessary to maintain voltage Vdc equal to voltage Vrapid and keep rapid-charging current Imax flowing though battery 102. However, when battery voltage Vbatt reaches voltage Vfinal, amplifier 202 rises from its low saturated state to maintain voltage Vfinal across battery 102. At the same time, current Ibatt is reduced, lowering voltage Vdc and switching CC amplifier 105 to a high impedance output. CV mode operation is then maintained by CV amplifier 106 until the fully-charged battery is replaced by a discharged battery. In this manner, battery 102 is provided with current Imax during CC mode operation and is maintained at voltage Vfinal during CV mode operation.

An alternative implementation of CC amplifier 105 and CV amplifier 106 is shown in FIG. 2b. Unidirectional transconductance error amplifiers 205 and 206 replace error amplifiers 201 and 202, respectively. Because amplifiers 205 and 206 are unidirectional, blocking diodes to prevent output contentions between the two amplifiers are not required. A pulldown resistor 112 converts the current outputs of amplifiers 205 and 206 into signal voltage Vs at summing node N1. While voltage Vbatt is less than voltage Vfinal, amplifier 206 sources no current into node N1. Therefore, the current provided by amplifier 205 controls the value of signal voltage Vs, and rapid charging current Imax flows through battery 102. Then, when voltage Vbatt reaches voltage Vfinal, the current from amplifier 206 drives voltage Vs to a level required for CV mode operation. A step-down resistor 111 at the output terminal of amplifier 205 ensures that amplifier 206 dominates the value of voltage Vs when voltage Vbatt reaches voltage Vfinal. Once again, CV mode operation is then maintained by CV amplifier 106 until fully-charged battery 102 is replaced by a discharged battery.

CC amplifier 105, CV amplifier 106, and output amplifier 108 are critical in determining the sharpness of the transition between CC and CV modes of operation. For the purpose of illustrating the effects to be discussed below, a battery can be modeled by a capacitor coupled in series with a resistor of resistance Resr ("esr" stands for "effective series resistance"). For our purpose, resistance Resr can be assumed substantially constant throughout the charging process. This battery model is illustrated in FIG. 3d.

FIG. 6, consisting of FIGS. 6a–6e, illustrates the voltage profiles of a conventional battery charging circuit and of an ideal charging circuit during a typical battery charging cycle. FIG. 6a depicts the battery low-side voltage Vdc. Vdc also represents the voltage across current detector 103 in FIG. 1 or the voltage across current sense resistor 301 in FIG. 3a when the implementation of a current detector shown is used. The battery charging current Ibatt is proportional to voltage Vdc and can be derived from the Vdc curve using the following equation:

$$Ibatt = Vdc / R103$$

where R103 is the resistance of current detector 103. Note that R103 equals R301 when current sense resistor 301 is used as the current detector circuit. FIG. 6b illustrates the battery voltage Vbatt. FIG. 6c illustrates the voltage Vcharge which is the resistance free voltage of the battery (i.e. the voltage across the capacitor in the battery model of FIG. 3d). In FIGS. 6a–e, charging of battery 102 commences at time T0.

Curves 602, 622, and 642, shown as dotted lines in FIGS. 6a–c, depict qualitatively the effects of a gradual transition between the CC and CV modes of operation. In comparison, curves 601, 621, and 641, shown as solid gray lines in FIGS. 6a–c, depict the ideal voltage characteristics of a battery charging circuit which minimizes the overall charging cycle time. Curve 621 (voltage Vbatt_ideal) represents the ideal battery voltage measured across the terminals of battery 102. When charging begins at time T0, Vbatt_ideal is substantially the product of the ideal charging current Ibatt_ideal and the effective series resistance Resr, assuming no residual energy is stored in battery 102 at time T0 (Ibatt_ideal is derived from voltage Vdc_ideal of curve 601 in FIG. 6a). As shown in FIG. 6b, at time T0, Vbatt_ideal is at a value of Vesr. Vbatt_ideal (curve 621) rises from this initial voltage to reach the final termination voltage Vfinal at time T1' while battery 102 is being charged under the CC mode. During the CC mode, battery 102 is being charged at a constant voltage Vdc equaling Vrapid (curve 601) and a constant charging current Ibatt equaling Imax.

At time T1', voltage Vdc ideal (curve 601) begins to decrease as CV mode takes over. Curve 601 shows that the ideal Vdc voltage decreases to a final value of Vdc/min at time T2'. In response, charging current Ibatt also decreases until a final maintenance current Imin is reached at time T2'. In FIG. 6c, curve 641 depicts voltage Vcharge_ideal which represents the charge condition of battery 102 under the conditions of ideal charging current Ibatt_ideal and ideal battery voltage Vbatt_ideal. According to the battery model, the difference between curve 621 and curve 641 results from the effective series resistance (esr) of battery 102 during the charging process. Voltage Vesr is provided by:

Vesr=Ibatt*Resr.

At time T1', when voltage Vbatt_ideal reaches termination voltage Vfinal, voltage Vcharge ideal (curve 641) is given by:

Vcharge ideal [T1']=Vfinal−Vesr(T1') =Vfinal−(Ibatt[T1']*Resr) =Vfinal−(Imax*Resr).

As CV mode takes over, charging current Ibatt decreases from current Imax and the voltage Vesr across the model resistor decreases. Consequently, voltage Vcharge_ideal (curve 641) increases, reaching the fully charged voltage Vfinal at time T2' when current Ibatt reaches Imin. AS a result, the ideal charging profile depicted by curves 601, 621 and 641 provides a minimum charging cycle time Tmin, equal to the elapsed time between times T2' and T0.

In practice, however, conventional battery charging systems are not able to deliver the optimum performance represented by curves 601, 621, and 641. The operation of amplifiers 105, 106, and 108 produces actual performance curves 602 (representing voltage Vdc_actual), 622 (representing battery voltage Vbatt_actual), and 642 (representing the "resistance-free" battery voltage Vcharge_actual), shown in dotted lines in FIGS. 6a, 6b, and 6c, respectively. In practice, as shown in curve 602, voltage Vdc_actual begins to decrease from voltage level Vrapid at time T1", prior to time T1', causing charging current Ibatt to also decrease from current level Imax at time T1" as well. As a result, the charging rate (i.e., the rate of change of Vcharge_actual, curve 642) begins to decrease from time T1" also, reaching final termination voltage at time T2". The actual charging cycle time Tactual, which is the time elapsed between times T1" and T0 is longer than Tmin, the cycle time in the ideal case. In fact, the longer battery charging cycle time is a result of the finite gains of amplifiers 105, 106, and 108. Therefore, by providing higher gains to amplifiers 105, 106 and 108, operational characteristics closer to the ideal characteristics illustrated by curves 601, 621 and 641 can be achieved.

Unfortunately, gains cannot be increased indefinitely in amplifiers used in conventional battery charging circuits due to limitations in their frequency responses. In both the CC and CV control loops of circuit 100, output amplifier 108 forms an effective two-stage amplifier with either CC amplifier 105 or CV amplifier 106. As a result, the loop response curve of each control loop includes a dominant pole at a first rolloff frequency and a secondary pole at a second rolloff frequency higher than the first rolloff frequency. Stability requirements dictate that the loop gains of the CC and CV control loops must be each less than unity when the phase shift of their respective frequency response curve reaches 180°. Since each pole introduces a phase shift of 90°, the unity gain frequency must occur before the second rolloff frequency. One method for meeting the stability requirement is to use a single-point compensation network 107, consisting of a capacitor C303 and a resistor 304, as shown in FIG. 3c. Single-point compensation, or parallel compensation, can shift the mid-band frequency response curve of a system away from the secondary pole of the system, thereby reducing the gain at the secondary pole of the system. By properly sizing capacitor C303 and resistor R304, the unity gain frequency can be pushed below the second rolloff frequency, ensuring control loop stability.

However, while single-point compensation simplifies frequency compensation, the gain of the system is often compromised because a single-point compensation system cannot perform a pole-splitting function, which is generally necessary for properly compensating a feedback system with high loop gain. In addition, to maintain a high gain, high component values are required. Without a high gain, a quick transition from CC mode to CV mode operation cannot be achieved, thereby limiting the achievable minimum charging cycle time.

Another method to reduce the gain at the secondary pole of the system is to provide "parallel compensation." Parallel compensation is discussed in Chapter 4 of the book "Frequency Compensation Techniques for Low-power Operational Amplifiers", by R. G. H. Eschauzier, and J. H. Huijsing, published by Kluwer Academic Publishers (1995). On page 66 in that chapter, Eschauzier et al. pointed out that parallel compensation has at least two drawbacks: impractically large compensation capacitor, and difficulty in controlling multiple parameters.

Accordingly, it is desirable to provide a charging control system that enables abrupt switching between CC and CV mode operation in order to minimize battery charging cycle time.

SUMMARY OF THE INVENTION

The present invention provides a control circuit for a battery charging system that minimizes battery charging cycle time by using high-gain amplification to provide sharp transitions between constant current (CC) mode and constant voltage (CV) mode of operation. According to the present invention, the control circuit includes a CC error amplifier, a CV error amplifier, an output amplifier, and two pole-splitting compensation networks (also known as "Miller compensation networks"). The pole-splitting compensation networks provide control loop stability by lowering the frequency of the dominant pole of the control circuit frequency response, while simultaneously raising the frequency of its secondary pole. The pole-splitting compensation networks allow the output amplifier to achieve a high loop gain, yielding abrupt transitions between the CC mode and CV mode of operation and reducing the required cycle time for charging a battery. The present invention also includes transconductance amplifiers as the CC and CV error amplifiers to optimize the control circuit for pole-splitting compensation. The current sourcing and sinking capability of the transconductance amplifiers allows the proper signals to be applied across the pole-splitting compensation networks.

In accordance with the present invention, the control circuit can be operated with a constant internal reference voltage or with a variable internal reference voltage. When a variable internal reference voltage is used, the charging cycle time of the control circuit is further minimized through a charge current compensation technique. Under the charge current compensation technique, a self-adjusting internal voltage reference is provided to allow the charging current to exceed the maximum bulk charge current and the battery voltage to exceed the final terminal voltage during the transition from the bulk charge mode to the trickle charge mode. The charge current compensation technique permits the control circuit to maximize the time a high charging current is maintained so that the overall charging cycle time is reduced.

BRIEF DESCRIPTION OF THE DRAWINGS

FIG. 6, consisting of FIGS. 6a–6e, are graphs comparing the voltage profiles of a conventional battery charging circuit, an ideal charging circuit, and a charging circuit using a variable reference voltage during a typical battery charging cycle.

Use of the same reference numbers in different figures indicates similar or like elements.

DETAILED DESCRIPTION

Figure 1:
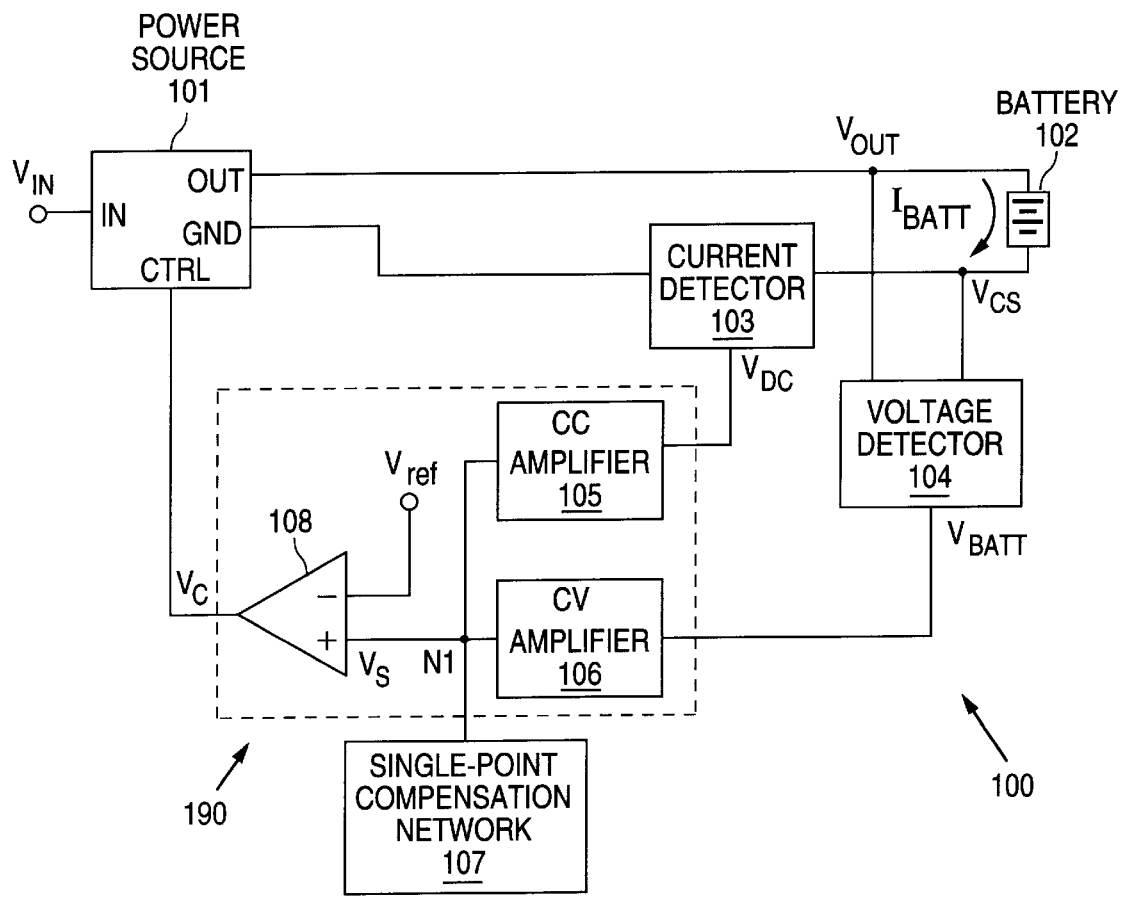
FIG. 1 is an example of a conventional battery charging circuit.
Figure 2A:
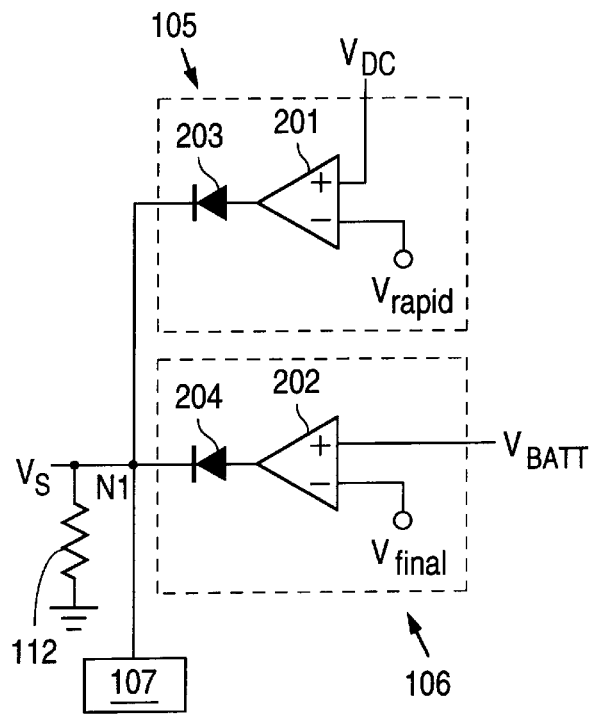
FIG. 2a is an example of the CC and Cv amplifiers employed in the conventional battery charging circuit of FIG. 1.
Figure 2B:
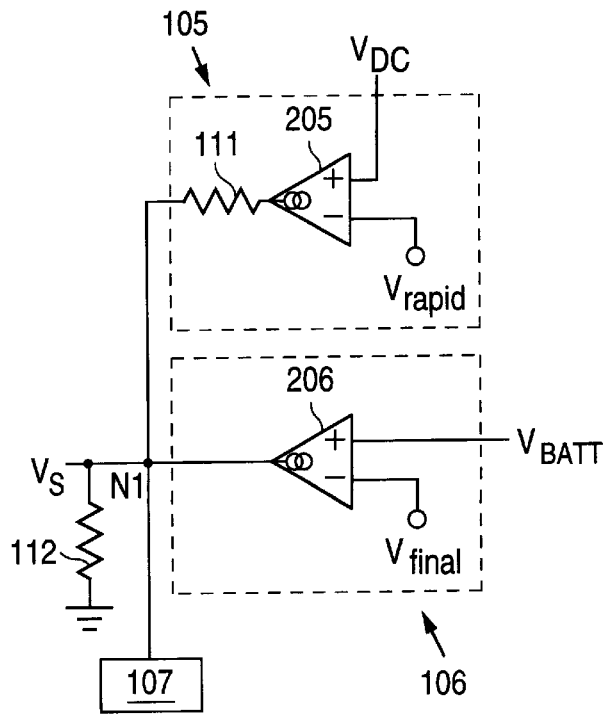
FIG. 2b is another example of the CC and CV amplifiers employed in the conventional battery charging circuit of FIG. 1.
Figure 3A:
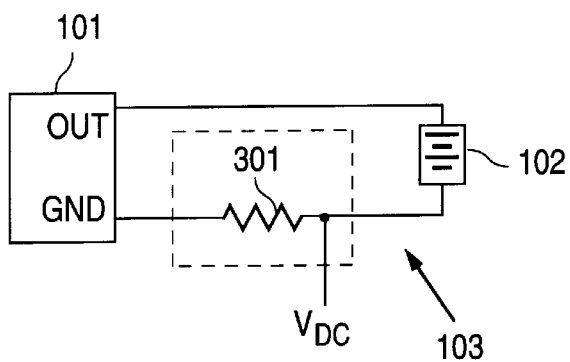
FIG. 3a is an implementation of a current detection circuit.
Figure 3B:
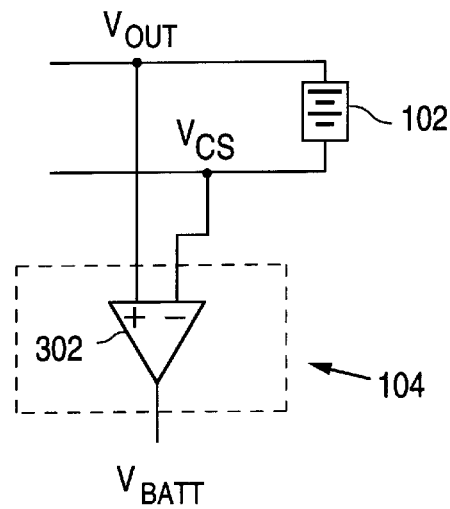
FIG. 3b is an implementation of a voltage detection circuit.
Figure 3C:
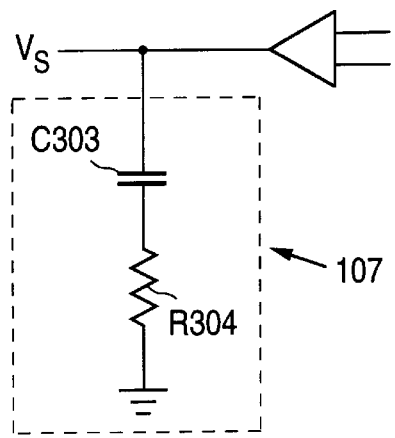
FIG. 3c is an example of a single point compensation network.
Figure 3D:
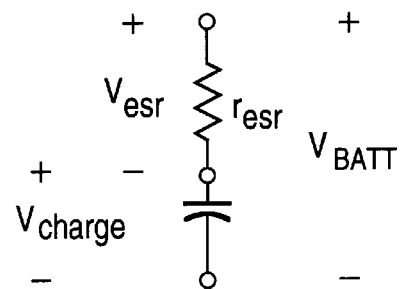
FIG. 3d shows an RC model of a battery being charged.
Figure 4:
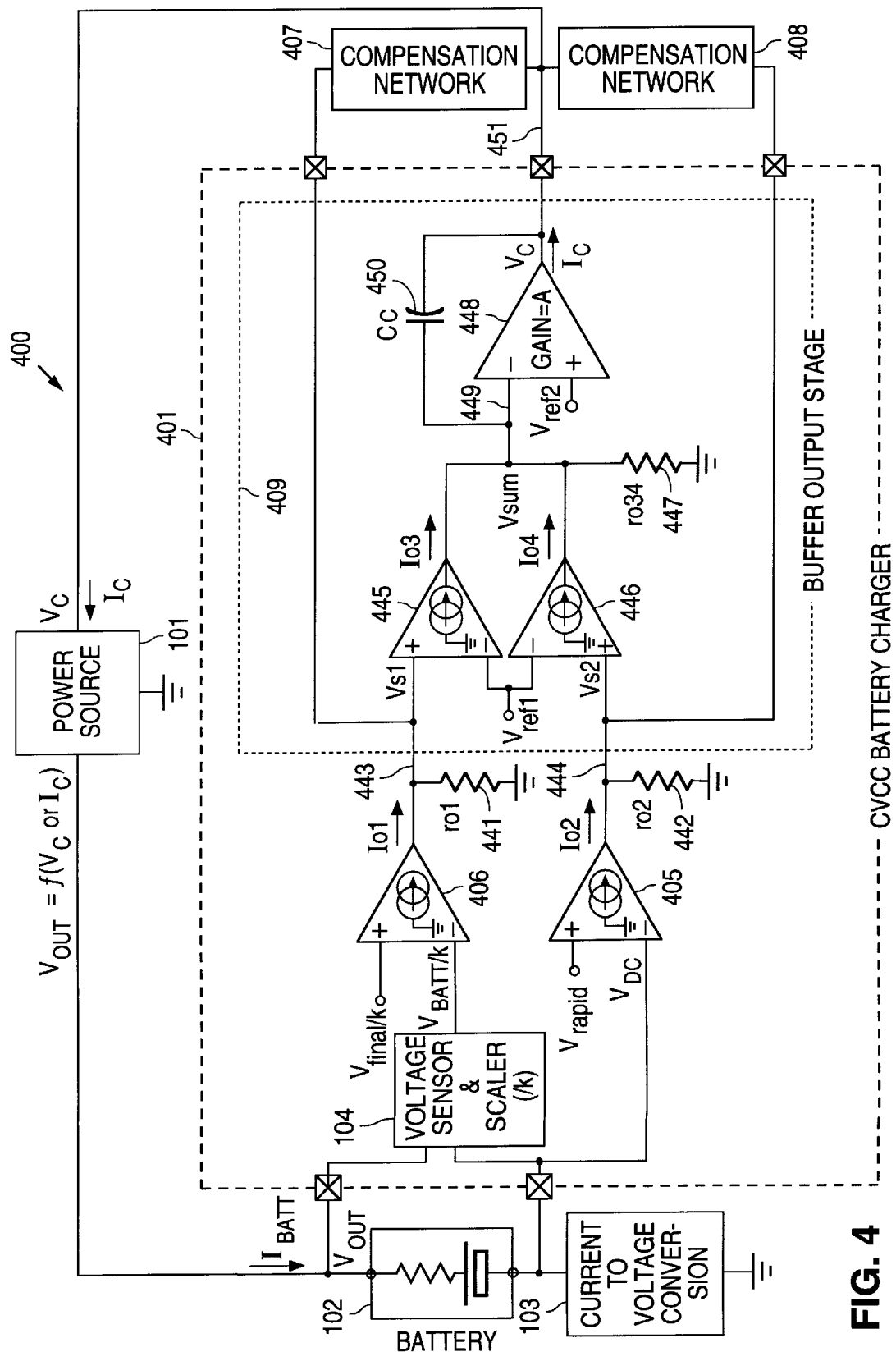
FIG. 4 is a functional block diagram of one embodiment of the charger control circuit of present invention.

The present invention provides a charger control circuit for a battery charging system that reduces the overall charging cycle time by maximizing the amount of time spent charging at high constant current. The charger control circuit of the present invention is particularly suitable for use in a battery charging system for lithium-ion (Li+) or lead acid batteries. FIG. 4 shows a battery charger circuit 400 in one embodiment of the present invention. A controllable power source 101 supplies a charging current Ibatt to a battery 102, while a current detector 103 and a voltage detector 104 monitor the current Ibatt and the voltage Vbatt across battery 102, respectively. In the present embodiment, charger control circuit 401 incorporates voltage detector 104 to measure the battery voltage Vbatt. Voltage detector 104 can be implemented as a differential to single-ended voltage detector as shown in FIG. 3b. In the configuration in FIG. 3b, voltage detector 104 receives differential voltage inputs representing the battery high-side voltage and the battery low-side voltage and generates a single-ended output, Vbatt, representing the voltage across battery 102. However, one skilled in the art will appreciate that voltage detector 104 is not a required element in the implementation of charger control circuit 401 and other means known in the art for measuring the battery voltage may be employed.

In the present embodiment, voltage detector 104 may further include a scaling device for scaling down the battery voltage before the battery voltage is furnished to the next stage in charger control circuit 401. The scaling device is required, for example, when the battery has a prescribed maximum allowable terminal voltage in excess of the operational voltage of charger control circuit 401. Voltage detector 104 then measures and scales down the battery voltage to a voltage value within the operational range of circuit 401. In the present embodiment, it is assumed that no scaling is required and a scale factor K of "1" is used. In cases where the scale factor K is of a value other than "1," reference voltage Vfinal, connecting to the positive input terminal of amplifier 406 in FIG. 4, is also proportionally scaled by scale factor K.

Charger control circuit 401 causes power source 101 to provide a high charging current Imax until the voltage Vbatt across battery 102 reaches the final termination voltage Vfinal, and thereafter provides sufficient current to "top-off" and to maintain the voltage across fully-charged battery 102 at voltage Vfinal.

Control circuit 401 is a three-stage amplification circuit including error amplifiers 405 and 406, whose output signals are received into a high gain buffer output stage 409. In the present embodiment, error amplifiers 405 and 406 are bi-directional transconductance error amplifiers implemented by folded cascode gain stages. Buffer output stage 409 is a high-gain stage and includes an amplifier 448 which is implemented by a Class A output stage. Control circuit 401 further includes two pole-splitting compensation networks 407 and 408 to provide frequency compensation for control circuit 401.

Charger control circuit 401 of the present invention can be operated using either a constant internal reference voltage or a variable internal reference voltage. The internal reference voltage (Vref) is used to derive reference voltages Vfinal and Vrapid which are coupled to error amplifiers 406 and 405 respectively (FIG. 4). Thus, voltages Vfinal and Vrapid can be fixed at their respective predefined voltage values or they can vary from the predefined values during the charging cycle. The advantages of using a variable internal reference voltage will be described in more detail below.

The operation of charger control circuit 401 will now be described with reference to FIG. 4. The current output Io1 of error amplifier 406 is given by:

$$Io1=(Vfinal-Vbatt)*Gm1,$$

where Gm1 is the transconductance of error amplifier 406. Resistor 441 transforms current Io1 into a voltage signal Vs1 at terminal 443 of buffer output stage 409. Similarly, the current output Io2 of error amplifier 405 is given by:

$$Io2=(Vrapid-Vdc)*Gm2,$$

where Gm2 is the transconductance of error amplifier 405, and Vdc is the battery low-side voltage relative to ground. Vdc is also the voltage across current detector 103. Resistor 442 transforms current Io2 into a voltage signal Vs2 at terminal 444 of buffer output stage 409.

Within buffer output stage 409, amplifiers 445 and 446 act as a compound input stage for output stage 409. In the present embodiment, amplifiers 445 and 446 are transconductance stages. Referring to FIG. 4, amplifiers 445 and 446 provide output currents Io3 and Io4, which are summed by resistor 447 to provide a voltage signal Vsum at inverting terminal 449 of amplifier 448. Together with capacitor 450, amplifier 448 acts as a low-pass filter with a predetermined gain A for voltage signal Vsum. The output voltage Vc at output terminal 451 of amplifier 448 is provided to pole-splitting compensation networks 407 and 408, providing respectively feedback signals to terminals 443 and 444.

According to output voltage Vc at terminal 451, power source 101 provides rapid charging constant current (CC) when voltage Vs2 is less than voltage Vs1. Alternately, power source 101 activates the constant voltage (CV) operation to maintain battery 102 at voltage Vfinal when voltage Vs1 is less than voltage Vs2. In effect, during CC operation, voltage Vc regulates voltage Vdc to Vrapid. At the same time, amplifier 406 monitors a voltage Vbatt, which is the voltage across battery 102, as measured by voltage detector 104. While voltage Vbatt is less than voltage Vfinal, the output current of amplifier 406 is greater than the output current of amplifier 405, so that Vs1 exceeds Vs2 during CC operation. As soon as the current through battery 102 drops below current Imax, the output current of amplifier 405 rises, so that voltage Vs2 rises towards voltage Vs1, eventually exceeding voltage Vs1 to initiate CV operation.

Because of the gain in buffer output stage 409, current Io3 is (a) proportional to the voltage difference between voltage Vs1 at terminal 443 and a reference voltage Vref1, when Vs1 is less than or equal to Vs2 (i.e. while in CV mode of operation), and (b) zero, when Vs1 exceeds Vs2 (i.e. while in CC mode of operation). When voltage Vs1 is less than Vs2 (CV mode), current Io3 is given by:

$$Io3=(Vs1-Vref1)*Gm3,$$

where Gm3 is the transconductance of amplifier 445. Similarly, amplifier 446 provides an output current Io4, which is (a) proportional to the voltage difference between voltage Vs2 at terminal 444 and the reference voltage Vref1, when Vs2 is less than Vs1 (i.e. while in CC mode of operation); and (b) zero, when voltage Vs2 exceeds or equal to Vs1 (i.e. while in CV mode of operation). When voltage Vs2 exceeds Vs1 (CV mode), current Io4 is given by:

$$Io4=(Vs2-Vref1)*Gm4,$$

where Gm4 is the transconductance of amplifier 446. Currents Io3 and Io4 are summed by resistor 447.

In operation, buffer output stage 409 receives outputs Vs1 and Vs2 from error amplifiers 406 and 405, respectively, and uses the lower of the two to generate an appropriate control signal Vc to send to power source 101. Reference voltage Vref1 is sized to ensure that buffer output stage 409 is biased at an appropriate common mode input voltage so that signal Vc can properly drive power source 101. In practice, buffer output stage 409 realizes an analog OR function between error amplifier 405 controlling the CC mode operation and error amplifier 406 controlling the CV mode operation.

Figure 7:
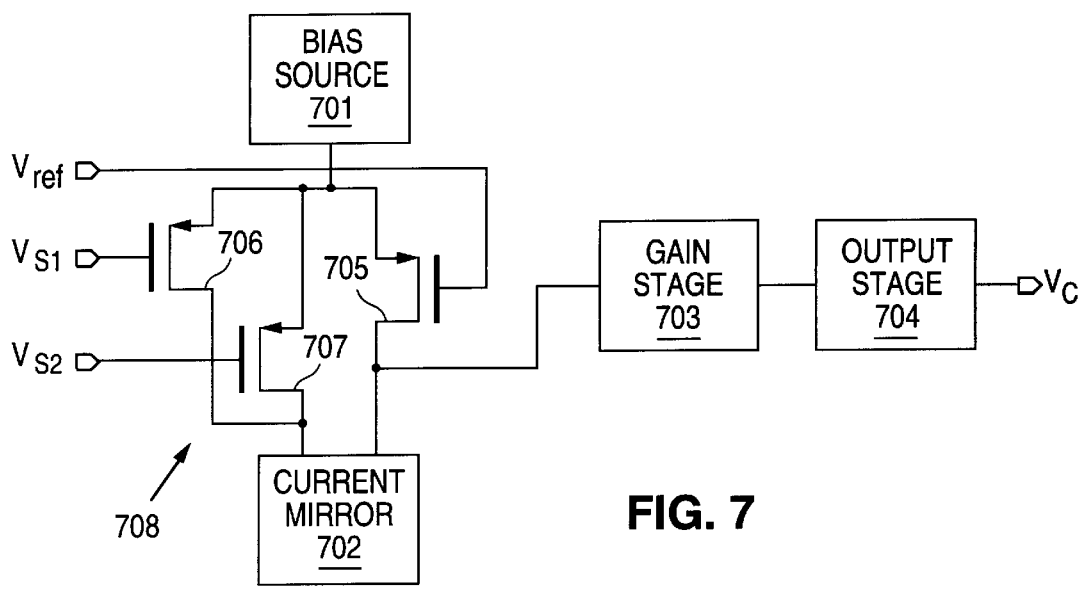
FIG. 7 is another implementation of the buffer output stage of the charger control circuit of the present invention.

FIG. 7 illustrates another embodiment of buffer output stage 409 in battery charger circuit 400. A bias source 701 and a current mirror 702 provide biasing and loading to a differential input stage 708. A transistor 705 makes up one half of stage 708 and provides the inverting input for buffer output stage 409. Transistors 706 and 707 make up the other half of stage 708 and provide two non-inverting inputs for buffer output stage 409. In this embodiment, transistors 705, 706 and 707 are sized equally. In other embodiments, the sizes of transistors 705, 706 and 707 can vary and do not have to be equal to each other. Because transistors 706 and 707 are connected in parallel with one another, they provide an analog OR function for the signals applied to the non-inverting inputs of buffer output stage 409, (i.e., voltages Vs1 and Vs2). A conventional gain stage 703 and a conventional output stage 704 complete the circuit. In other embodiments, output stage 704 can be a class A output stage. While this embodiment of buffer output stage 409 uses FET devices, one skilled in the art will appreciate that bipolar transistors can be used to provide the same operational characteristics. Also, additional transistors can be connected in parallel with transistors 706 and 707 or transistor 705 to provide additional inputs for OR functionality.

In control circuit 401, CC error amplifier 405 and CV error amplifier 406 are connected in series with buffer output stage 409 to form, respectively, a CC control loop and a CV control loop. In this configuration, each of the CC and CV control loops forms a three-stage amplifier circuit. Control loop stability requirements dictate that the loop gain of the CC and CV control loops of charger circuit 400 must be each less than unity when the phase shift of their frequency response curves reaches 180°. The present invention incorporates pole-splitting, or Miller compensation, to ensure control loop stability. An example of an implementation of pole-splitting compensation networks 407 and 408 is shown in FIG. 5.

Figure 5:
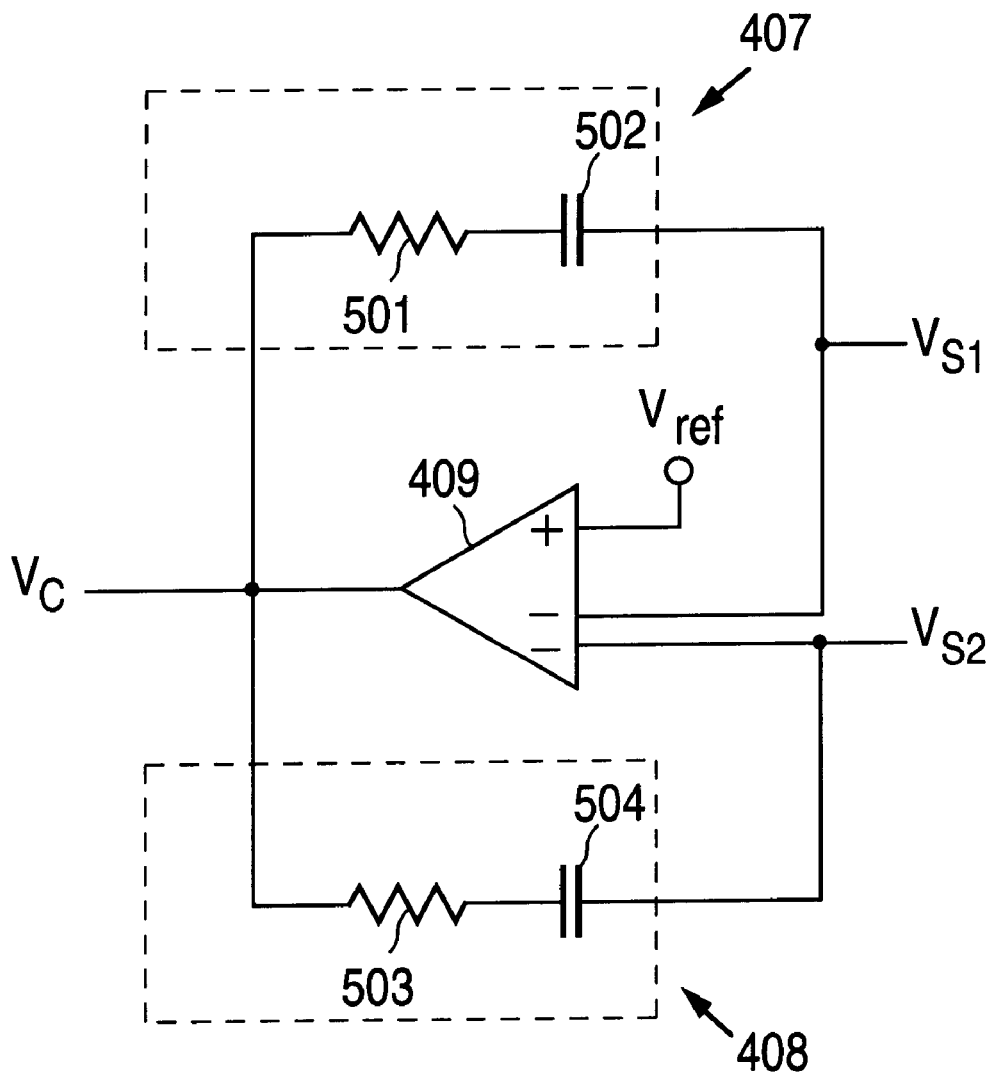
FIG. 5 is an implementation of the pole-splitting compensation networks.

As shown in FIG. 5, pole-splitting network 407 includes a resistor 501 and a capacitor 502 serially-connected in a feedback loop of buffer output stage 409. This type of compensation network is also known as lag-lead network. The dominant pole/zero system provided by resistor 501 and capacitor 502 lowers the frequency of the dominant pole of the CV control loop of control circuit 401, while simultaneously raising the frequency of its secondary pole. As a result, by appropriately sizing resistor 501 and capacitor 502, a high DC loop gain system can be properly compensated to ensure stability. In other words, a higher gain can be achieved before frequency effects come into play.

Similarly, pole-splitting compensation network 408 includes a resistor 503 and a capacitor 504 serially- connected in a feedback loop of buffer output stage 409. Because transconductance error amplifiers 405 and 406 can both source and sink current, the necessary voltages for proper compensation can be provided across compensation networks 407 and 408 regardless of which error amplifier is controlling buffer output stage 409.

Figure 6A:
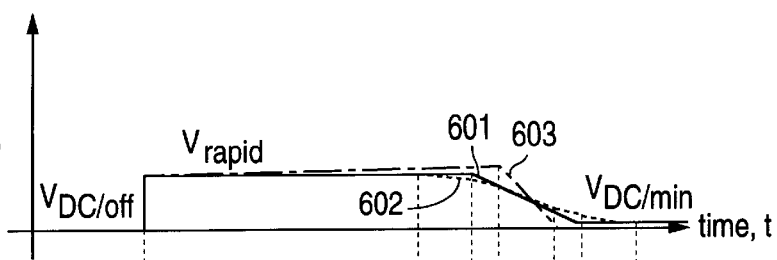
FIG. 6a illustrates the battery low-side voltage (Vdc).
Figure 6B:
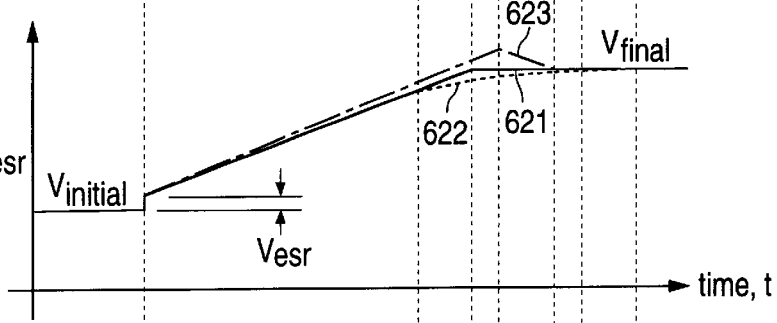
FIG. 6b illustrates the battery voltage (Vbatt).
Figure 6C:
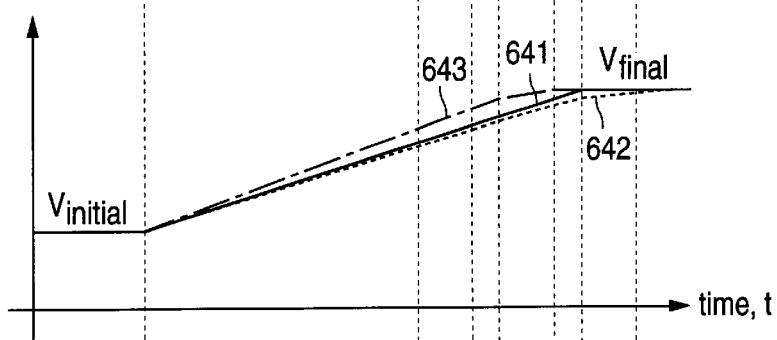
FIG. 6c illustrates the charge condition (Vcharge).
Figure 8:
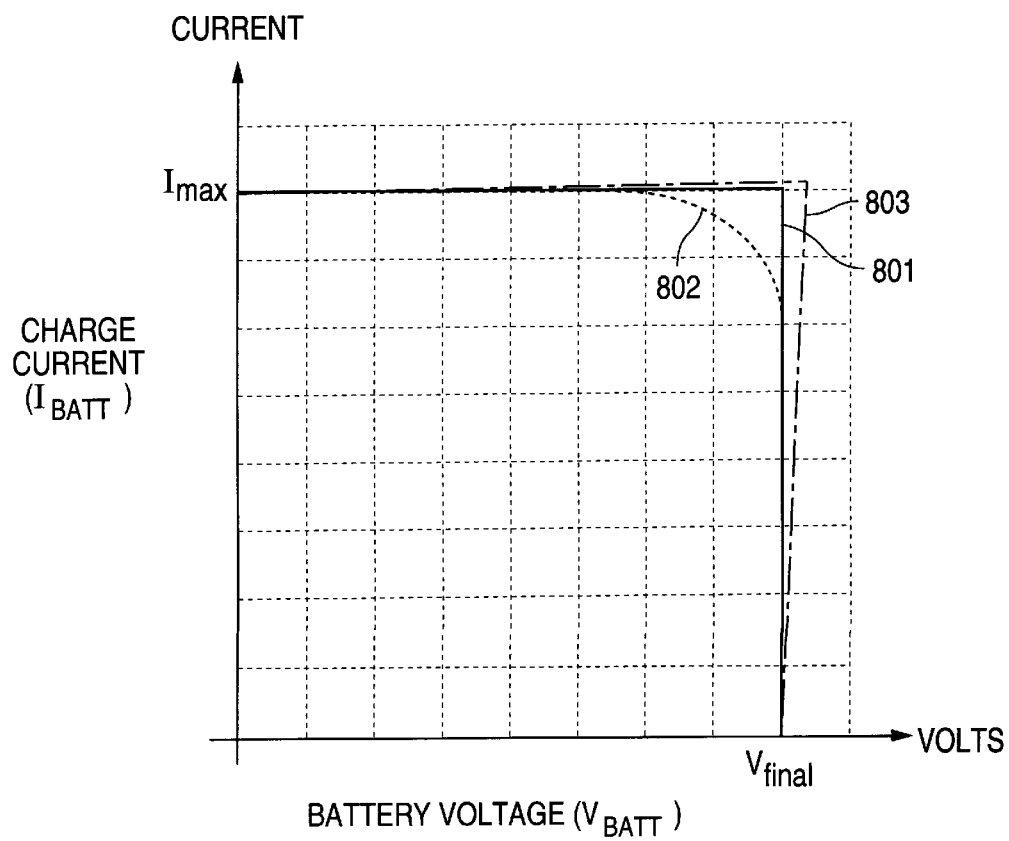
FIG. 8 is a plot of the charging current verses the battery voltage illustrating the operation of the charger control circuit of the present invention when operated using a constant reference voltage and a variable reference voltage as compared to a conventional charger control circuit.

When charger control circuit 401 is operated with a constant reference voltage, charger circuit 400 generates voltage profiles closely approximating the ideal voltage profiles illustrated in FIGS. 6a–6c and realizes a reduction in charging cycle time of T2"-T2' as compared to a conventional charger system. FIG. 8 illustrates the charging current (Ibatt) versus the battery voltage (Vbatt) characteristics of a conventional charger circuit (curve 802) and battery charger circuit 400 of the present invention using a constant reference voltage (curve 801). Curve 801 illustrates that the charging current Ibatt is maintained at the maximum level (Imax) when voltage Vbatt is below the final termination voltage (Vfinal). In one embodiment, Imax has a value of 0.8 Amp and Vfinal has a value of 4.2 volts. When the battery voltage reaches Vfinal, control circuit 401 transitions from CC mode to CV mode of operation. Curve 801 illustrates that the transition from CC operation to CV operation is accomplished in an abrupt fashion. In operation, the charging current does not decrease to zero, rather, the charging current decreases to Imin which has a value of approximately ten milli-Amps.

By providing higher gain in control circuit 401, an abrupt transition from CC to CV mode of operation can be achieved as illustrated by curve 801 in FIG. 8. If control circuit 401 has low loop gain, the transition from CC mode to CV mode would be a gradual decrease as depicted by the dotted curve 802 in FIG. 8. An abrupt transition from CC to CV mode of operation ensures that battery 102 is charged with the maximum current for the maximum time possible, resulting in a shorter overall battery charging cycle time. In addition, because of the Miller effect magnification of capacitors 502 and 504 in pole-splitting compensation networks 407 and 408, the required capacitance of capacitors 502 and 504 are much smaller than the corresponding capacitor required in a single-point compensation network.

If the compensation networks 407 and 408 are included in the same integrated circuit as control circuit 401, capacitors 502 and 504 do not require a large capacitance margin to ensure proper compensation of all integrated circuits in a production lot. The capacitance of a pole-splitting network depends on the transconductance ratio of the amplifier stages being compensated, rather than the transconductance product of the amplifier stages, as in a single-point compensation network. Due to the nature of integrated circuit manufacturing, while specific transconductance values are difficult to produce, precise transconductance ratios are readily achieved. Therefore, an advantage of the present invention is that, since all the integrated circuits in the production lot have consistent amplifier stage transconductance ratios, capacitors 502 and 504 do not require extra capacitance margin to compensate for manufacturing variations.

When operated with a-constant reference voltage, charger control circuit 401 is able to achieve a reduction in charging cycle time from T2" to T2' (see FIG. 6). However, when charger control circuit 401 is operated with a variable reference voltage, the performance of charger control circuit 401 can be further enhanced. The advantages of using a variable reference voltage in charger control circuit 401 is described with reference to FIGS. 6 and 8. In FIG. 6, curves 603, 623, 643, 663 and 683 (shown in dash-dotted lines) depict the voltage profiles of charger control circuit 401 when operated with a variable reference voltage. Curve 803 in FIG. 8 depicts the charging current (Ibatt) versus battery voltage (Vbatt) characteristics of charger control circuit 401 when operated with a variable reference voltage.

A Li+ secondary battery has a predetermined, maximum amount of charge (Qmax) that it is capable of safely storing. The total amount of charge that the charger puts into the battery over the course of a charge cycle is found by integrating the area under the charging current (Ibatt) profile as a function of time. As described above, charging current Ibatt is a function of the voltage across the current detector 103 (Vdc) and the resistance of current detector 103 (denoted R103), and is given by the equation: Ibatt=Vdc/R103. Therefore, the behavior of Ibatt can be derived from the voltage curve for Vdc in FIG. 6a. The charging cycle time is minimized by maximizing the time battery 102 is being charged under the CC mode such that the maximum charge Qmax is achieved in the shortest amount of time. As described above and illustrated in FIG. 6a, for a conventional charger control circuit, Qmax is achieved at time T2" (curve 602) while for charger control circuit 401 using a constant reference voltage, Qmax is achieved at time T2' (curve 601). However, by applying a variable reference voltage to charger control circuit 401, Qmax can be achieved at a reduced time T2 (curve 603). Therefore, charger control circuit 401 is able to achieve a further reduction in charging cycle time from time T2' to T2.

When charger control circuit 401 is operated with a variable reference voltage, the performance of control circuit 401 is improved through a charge current compensation technique. The charge current compensation technique provides an internal reference voltage (Vref) that is self-adjusting such that the characteristics of curve 803 in FIG. 8 are achieved. Internal reference voltage Vref is used to derive the reference voltages Vfinal and Vrapid (FIG. 4) which are the reference voltages applied to error amplifiers 406 and 405 in control circuit 401. In the description which follows, when a variable reference voltage is used, error amplifiers 405 and 406 (together with buffer output stage 409) are said to operate in the bulk charge mode and the trickle charge mode respectively. Although the term "bulk charge mode" is used interchangeably with the term "constant current mode" and the term "trickle charge mode" is used interchangeably with the term "constant voltage mode" for those skilled in the art, the terms "bulk charge mode" and "trickle charge mode" more accurately describe the operation of the charger circuit when operated with a variable reference voltage because the charge current Ibatt and the battery voltage Vbatt are not held constant during the charging cycle.

During the bulk charge mode, the self-adjusting reference voltage causes the charging current Ibatt to increase slightly beyond Imax as the battery charges (see curve 803 of FIG. 8). The charging current Ibatt reaches its maximum value at the point that charger control circuit 401 transitions from the bulk charge mode to the trickle charge mode. The increase in charging current during the bulk charge mode is tracked by an increase in the battery voltage, Vbatt. Therefore, the maximum value of Vbatt also occurs at the transition point where Vbatt exceeds voltage Vfinal by a small amount. The benefit of this type of charge control is that the battery is charged with a high current for a longer period of time as compared to conventional chargers. As previously described, a conventional charger control circuit provides a gradual transition from CC mode (or alternately, bulk charge mode) to CV mode (or alternately, trickle charge mode) (curve 802). Thus, the battery is not charged with the maximum current for the maximum time possible. For charger control circuit 401 operated with a constant reference voltage, an abrupt transition is achieved (curve 801) such that the battery is subjected to CC mode of charging (bulk charging) for the maximum possible time. By using a variable reference voltage in control circuit 401, both Ibatt and Vbatt peak at the transition point from the bulk charge mode to the trickle charge mode at values above Imax and Vfinal. Thus, the battery is exposed to a high charge current for an even longer period of time. As the battery charges during the trickle charge mode, Vbatt gradually decreases to Vfinal as illustrated by curve 803 in FIG. 8.

Figure 6D:
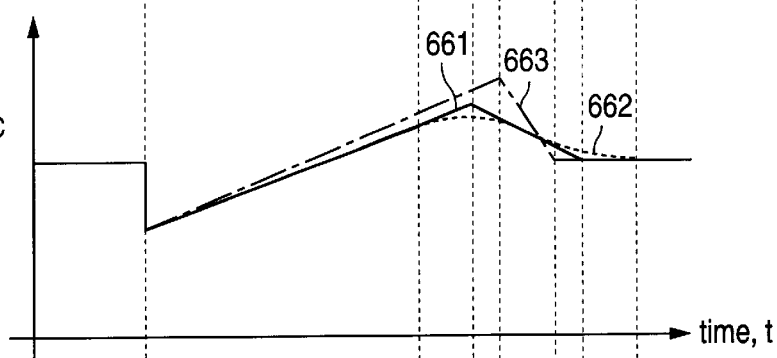
FIG. 6d illustrates the output voltage of the power source (Vout).

Returning to FIG. 6, FIGS. 6a–e illustrate the voltage profiles of charger control circuit 401 operated with a variable reference voltage. Curve 623 in FIG. 6b and curve 663 in FIG. 6d, showing the battery voltage Vbatt and the charger output voltage Vout, illustrate the voltage "overshoot" occurring at time T1. The voltage "overshoot" has the effect of prolonging the bulk charge mode of operation such that for control circuit 401, the transition occurs at time T1 which is later than both the time T1" (transition time for the conventional circuit) or the time T1' (transition time for circuit 401 using a constant reference voltage). However, it is important to note that the charge condition of battery 102, represented by voltage Vcharge, is never allowed to exceed voltage Vfinal (curve 643 in FIG. 6c). It is well known that applying a voltage greater than Vfinal to a Li+ battery can damage the battery and create an unsafe condition. The charge current compensation technique is able to enhance the performance of charger control circuit 401 while allowing battery 102 to be charged safely and quickly without the risk of damage.

Figure 6E:
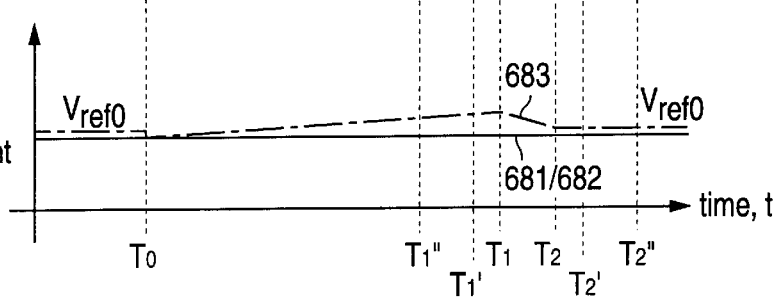
FIG. 6e illustrates the reference voltage (Vref).

The operation of the charge current compensation technique will now be described with reference to FIGS. 4, 6e, 9 and 10. As described above in reference to FIG. 4, reference voltages Vfinal and Vrapid are coupled to the positive input terminals of amplifiers 406 and 405, respectively, and compared with battery voltage Vbatt and voltage Vdc, coupled to the negative terminals of amplifiers 406 and 405, to generate currents Io1 and Io2. Under the charge current compensation technique of the present invention, the internal reference voltage Vref is defined as:

$$Vref=Vref0+Vos,$$

where Vref0 is a constant reference voltage and Vos is a variable voltage offset which is a function of voltage Vout (Vout is the sum of Vbatt and Vdc). When a constant reference voltage is desired, Vos is set to zero such that Vref equals Vref0. However, when a variable reference voltage is desired, i.e. when Vos is non-zero, reference voltage Vref is a function of Vout. Consequently, voltages Vfinal and Vrapid, which are derived from reference voltage Vref, are also a function of Vout. FIG. 6e illustrates the voltage profiles of Vref. Curve 681/682 illustrates a constant reference voltage Vref which is used in a conventional circuit and in charger control circuit 401 when operated with a constant reference voltage, i.e., Vos is zero. Curve 683 illustrates the behavior of Vref according to the charge current compensation technique when a variable reference voltage is used.

Beginning at time T0, Vref increases from its initial minimum value as Vout increases (curve 663 in FIG. 6d). The increase in voltage Vref is entirely due to offset voltage Vos. Vref reaches a maximum value at time T1 when charger control circuit 401 transitions from the bulk charge mode to the trickle charge mode. After the transition, Vref decreases until it reaches the final constant value of Vref0 at time T2.

By allowing Vref to increase slightly as a function of Vout, references voltages Vfinal and Vrapid also increase slightly as a function of Vout. Therefore, the time that voltage Vdc is maintained at Vrapid is extended to time T1 (curve 603 in FIG. 6a). Battery voltage Vbatt is increased to a value slightly above Vfinal for a period of time as charger control circuit 401 approaches the bulk charge to trickle charge mode transition. The effect of slightly extending Vdc and slightly increasing Vbatt is that the amount of time that battery 102 is subjected to a high charge current is increased so that the overall charging cycle time is reduced. Under the trickle charge mode, Vref decreases down to Vref0 and Vbatt decreases down to voltage level Vfinal and charger control circuit 401 operates in the trickle charge mode (or alternately, CV mode) as previously described.

Figure 9:
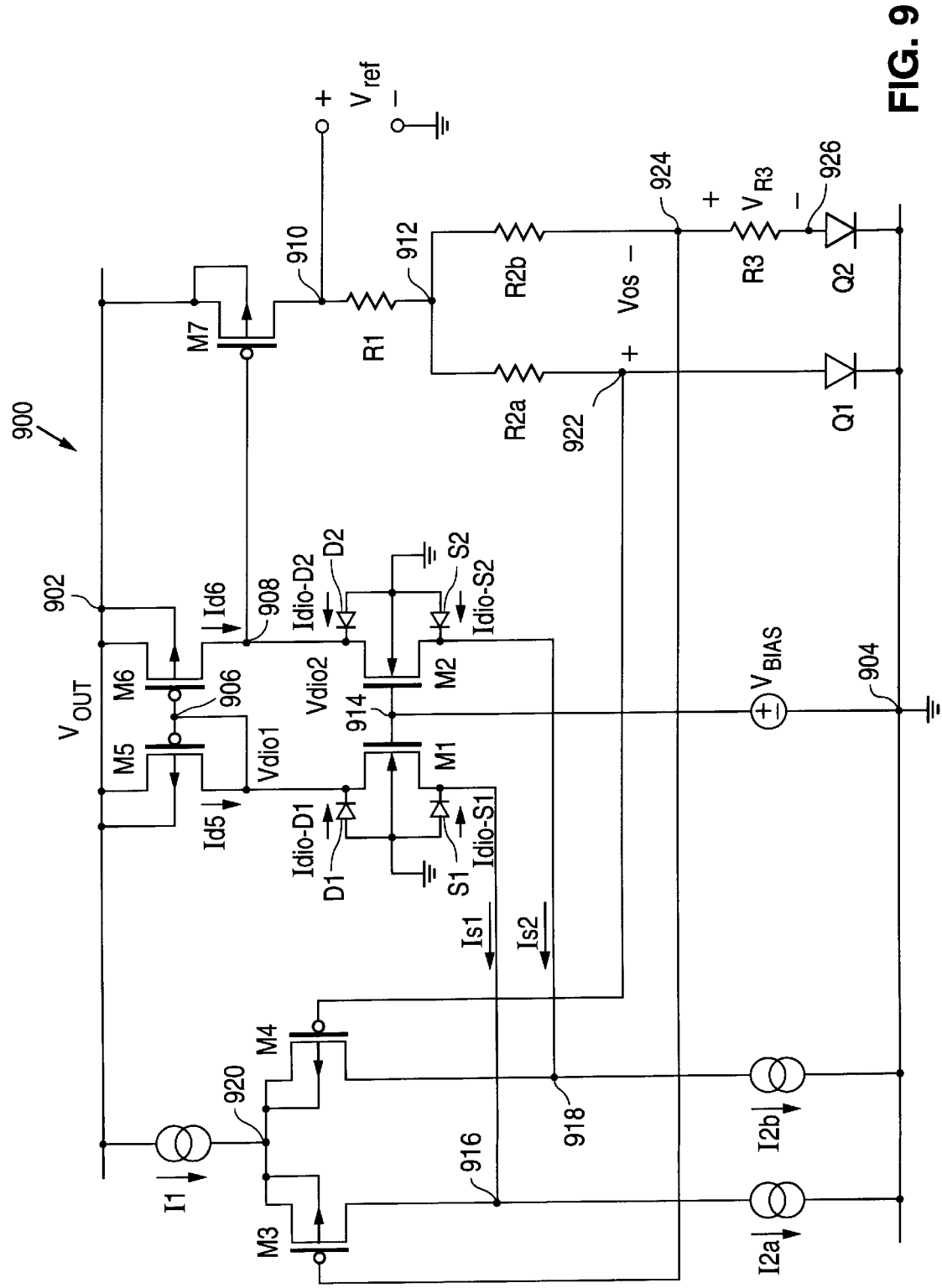
FIG. 9 is a circuit diagram illustrating an implementation of a bandgap reference circuit used to generate the internal reference voltage Vref.

FIG. 9 illustrates an embodiment of a bandgap reference circuit 900 for generating the internal reference voltage Vref. Voltage Vout is the power supply for reference circuit 900. P-channel transistors MS and M6 have their drain terminals connected to voltage Vout at node 902. Transistors MS and M6 form a current mirror such that their respective drain current Id5 and Id6 are substantially equal (when channel-length modulation effect is neglected). However, the drain voltages of transistors MS and M6, Vdio1 (node 906) and Vdio2 (node 908), differ. Specifically, because transistor MS is diode-connected, Vdio1 is fixed with respect to Vout. Vdio2, on the other hand, is dependent upon transistor M7 which is connected between node 902 (Vout) and node 910 (Vref). Drain voltages Vdio1 and Vdio2 are defined as follows:

$$Vdio1=Vout-VSG(M5),$$

$$Vdio2=Vout-VSG(M7),$$

where VSG(M5) and VSG(M7) are the source-to-gate voltages of transistors M5 and M7 respectively. Because VSG (M5) is designed to be greater than VSG(M7), Vdio1 is less than Vdio2. Vdio1 and Vdio2 provide different biasing voltages to body diodes D1 and D2 at the drain terminals of N-channel transistors M1 and M2. Body diodes D1, D2, S1 and S2 are formed at the n-channel source and drain regions of transistors M1 and M2 with respect to the p-type substrate or well. The p-regions of the body diodes are connected to ground so that the diodes are reverse biased during the operation of reference circuit 900.

Figure 10:
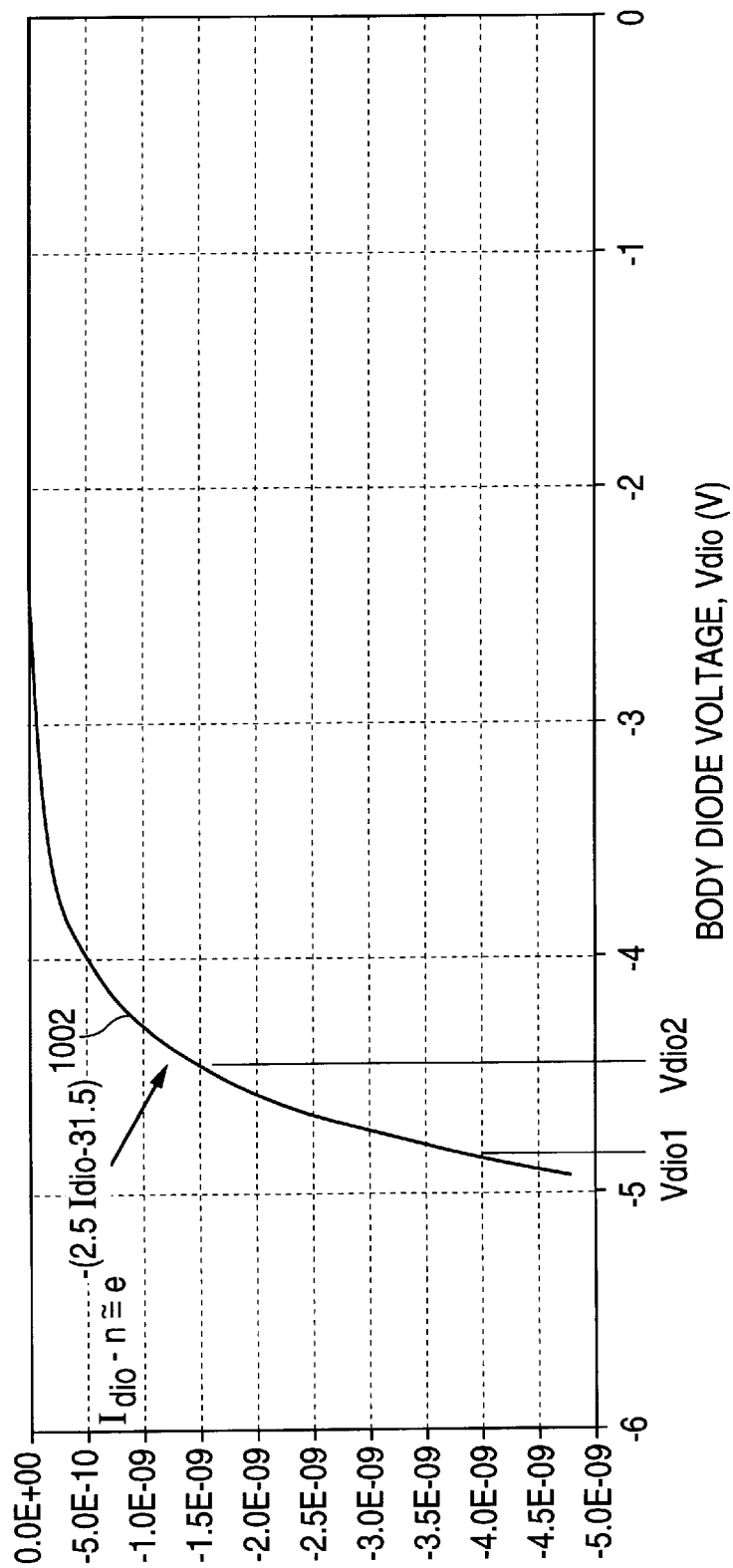
FIG. 10 is a plot of characteristics of the reverse-biased body diode leakage current versus the body diode voltage of the body diodes in FIG. 9.

As Vout increases, Vdio1 and Vdio2 increase at different rates. The different values of Vdio1 and Vdio2 cause diodes D1 and D2 to be reverse-biased at different voltage levels, thus generating different reverse-biased leakage currents Idio-D1 and Idio-D2. FIG. 10 illustrates the characteristics of the reverse-biased leakage current (Idio) versus the diode voltage (Vdio) of the body diodes in FIG. 9. Curve 1002 in FIG. 10 is an exponential curve depicting the reverse-biased leakage current of a body diode according to one exemplary fabrication process. As shown in FIG. 10, when the voltages Vdio1 and Vdio2 differ by 0.4V, the reverse-biased leakage currents can differ by approximately 2.0 nano-Amps. Because the gate terminals of transistors M1 and M2 are driven by a bias voltage Vbias, the body diodes S1 and S2 are biased at substantially the same voltage level. Thus, current Idio-S1 and Idio-S2 are substantially equal. The currents Is1 and Is2 at the source terminals of transistors M1 and M2 are defined as follows:

Is1=Id5+Idio-D1+Idio-S1, and

Is2=Id6+Idio-D2+Idio-S2.

Because Id5 substantially equals Id6 and Idio-S1 substantially equals Idio-S2, the difference in the Is1 and Is2 currents can be approximated as:

ΔIs=Idio-D2−Idio-D1.

Currents Is1 and Is2 drive the drain terminals of p-channel transistors M3 (node 916) and M4 (node 918). Transistors M3 and M4 are a source coupled differential pair having their source terminals driven by current source I1 (node 920) and their drain terminals connected to current sources I2*a* and I2*b* respectively (current sources I2*a* and I2*b* have the same current values I2). The differential current ΔIs causes the gate voltages of M3 and M4 to vary (according to the transconductance gains of M3 and M4), thereby creating the offset voltage Vos between node 922 and node 924. Offset voltage Vos is coupled to a bandgap reference subcircuit including resistors R1, R2*a*, R2*b* and R3, where R2*a* and R2*b* have the same resistance values R2. Diode Q1 is connected between nodes 922 and ground node 904. Diode Q2 is connected between nodes 926 and ground node 904. These diodes have unequal emitter areas and are fundamental to the operation of the bandgap reference circuit 900. Reference voltage Vref is provided at node 910 and has a dependency on Vout according to the following equation:

$$V_{ref} = V_{Q2} + (V_{R3} - V_{OS})\left(1 + \frac{2R1 + R2}{R3}\right)$$

Where $V_{Q1}$ and $V_{Q2}$ are the forward biased diode voltages of diodes Q1 and Q2, Vos=(Is2−Is1) 1 $Gm_{M4}$, where $Gm_{M4}$ is the transconductance of transistor M4, and $V_{R3}=V_{Q1}-V_{Q2}$.

It is assumed that Vos<<VQ1 or Vos<<VQ2. Vos is dependent on Vout because Vdio1 and Vdio2 (and correspondingly Idio-D1 and Idio-D2) are dependent on Vout as shown in FIG. 10.

In the reference circuit of FIG. 9, the reference voltage Vref varies with respect to the circuit power supply voltage Vout. In other applications, a supply-voltage-dependent Vref would be deemed undesirable. Reference circuits are typically designed so that the reference voltage is fixed and does not vary with respect to the power supply of the circuit. However, in the present invention, reference circuit 900 is intentionally designed so as to provide an offset voltage Vos which is dependent upon the power supply Vout. In the charger circuit 400 of the present invention, the supply-voltage-dependency of Vref is advantageously applied to further enhance the performance of charger control circuit 401. The application of a supply-voltage-dependent reference voltage to a charger control circuit in order to improve the charging cycle time of a battery charger circuit has not been appreciated prior to the present invention.

The detailed description above is provided to illustrate specific embodiments of the present invention and is not intended to be limiting. Numerous modifications and variations within the scope of the present invention are possible. The present invention is set forth in the following claims.

I claim:

1. A reference voltage circuit, comprising:

a current mirror coupled to a first power supply;

a first transistor having a first current handling terminal coupled to said current mirror, a second current handling terminal providing a first current, and a control terminal coupled to a first bias source;

a second transistor having a first current handling terminal coupled to said current mirror, a second current handling terminal providing a second current, and a control terminal coupled to said first bias source;

a differential pair having a first input terminal coupled to receive said first current, a second input terminal coupled to receive said second current, a first and second output terminals providing a first output voltage, said first output voltage having a value indicative of a difference between said first current and said second current;

a bandgap reference circuit coupled to receive said first output voltage of said differential pair and generating a first reference voltage at an output terminal and a third transistor having a first current handling terminal coupled to said first power supply, a second current handling terminal coupled to said output terminal of said bandgap reference circuit, and a control terminal coupled to said first current handling terminal of said second transistor;

wherein said first reference voltage varies in relation to said first power supply.

2. The reference voltage circuit of claim 1, wherein said first transistor and said second transistor are MOS transistors and each comprises a first diode disposed between said first current handling terminal and a ground node, and a second diode disposed between said second current handling terminal and said ground node.

3. The reference voltage circuit of claim 2, wherein said first and second diodes of each of said first and second transistors are formed between a diffusion region and a substrate of each of said first and second transistors.

4. The reference voltage circuit of claim 2, wherein said first and second cents are related to the reverse-biased diode currents of said first and second diodes.

5. The reference voltage circuit of claim 1, wherein said bandgap reference circuit comprises:

a first resistor coupled between said output terminal of said bandgap reference circuit and a first node;

a second resistor coupled between said first node and a second node;

a third resistor coupled between said first node and a third node, said third resistor having a resistance value substantially equal to said second resistor;

a fourth resistor coupled between said third node and a fourth node;

a first diode coupled between said second node and a ground node; and a second diode coupled between said fourth node and said ground node.

6. The reference voltage circuit of claim 5, wherein said first and second diodes each comprises a diode-connected bipolar transistor, and said second diode has an emitter area substantially greater than an emitter area of said first diode.

7. A method for providing a reference voltage, comprising the steps of providing a first voltage and a second voltage being related to a power supply voltage, said first voltage having a value different from said second voltage;

generating a first current based on said first voltage;

generating a second current based on said second voltage;

generating a third voltage based on a difference between said first current and said second current; and generating said reference voltage based on a bandgap reference voltage and said third voltage.

8. The method of claim 7, wherein said step of generating a first current comprises the step of:

applying said first voltage to cause a first diode to be reverse biased; and generating a reverse-biased diode current as said first current.

9. The method of claim 7, wherein said step of generating a second current comprises the step of:

applying said second voltage to cause a second diode to be reverse biased, and generating a reverse-biased diode current as said second current.

* * * * *

UNITED STATES PATENT AND TRADEMARK OFFICE
CERTIFICATE OF CORRECTION

PATENT NO. : 6,215,291 B1　　　　　　　　　　　　　　　　　　　　Page 1 of 1
DATED : April 10, 2001
INVENTOR(S) : Mark J. Mercer It is certified that error appears in the above-identified patent and that said Letters Patent is hereby corrected as shown below:

<u>Title page,</u>
Assignee, delete "National Semiconductor Incorporated" and add -- National Semiconductor Corporation --.

Signed and Sealed this

Fourteenth Day of May, 2002

*Attest:*

JAMES E. ROGAN
*Attesting Officer*　　　*Director of the United States Patent and Trademark Office*